United States Patent [19]

Kataoka

[11] Patent Number: 4,629,650
[45] Date of Patent: Dec. 16, 1986

[54] PROCESS FOR PRODUCING MOLDED THERMOPLASTIC RESIN

[75] Inventor: Hiroshi Kataoka, Tokyo, Japan

[73] Assignee: Asahi Kasei Kogyo Kabushiki Kaisha, Japan

[21] Appl. No.: 565,868

[22] Filed: Dec. 27, 1983

[30] Foreign Application Priority Data

Dec. 30, 1982 [JP]  Japan .............................. 57-234239
Dec. 30, 1982 [JP]  Japan .............................. 57-234240
Jul. 5, 1983 [JP]  Japan .............................. 58-121005

[51] Int. Cl.⁴ .................... B32B 7/06; B29C 43/20; B29C 65/76; B29C 67/22
[52] U.S. Cl. .................... 428/213; 156/247; 156/344; 264/1.7; 264/45.9; 264/53; 264/54; 264/171; 264/173; 264/286; 264/288.8; 264/289.6; 264/290.2; 264/292; 264/338; 425/96; 425/97; 425/817 R; 521/79; 521/143; 521/145; 521/146; 521/149; 521/184
[58] Field of Search ............. 264/45.9, 46.1, 171, 264/338, 292, 173, 512, 514, 515, 1.6, 290.2, 53, 51, 54, 286, 1.7, 288.8, 289.6; 156/247, 344; 425/97, 107; 428/213; 521/79, 143, 145, 149, 150, 184

[56] References Cited

U.S. PATENT DOCUMENTS

| | | | |
|---|---|---|---|
| 2,270,185 | 1/1942 | Dulmage | 264/292 X |
| 2,443,289 | 6/1948 | Bailey | 425/97 |
| 2,537,977 | 1/1951 | Dulmage | 264/53 |
| 2,558,632 | 6/1951 | Trozmuller | 156/289 |
| 2,579,815 | 12/1951 | Gialanella | 425/97 |
| 2,597,553 | 5/1952 | Weber | 425/107 X |
| 2,688,153 | 9/1954 | Gebauer et al. | 425/97 |
| 2,688,768 | 9/1954 | Rayburn | 425/97 X |
| 3,029,476 | 4/1962 | Merck et al. | 264/46.1 |
| 3,219,733 | 11/1965 | Harris et al. | 425/97 X |
| 3,322,870 | 5/1967 | Sacks | 264/514 X |
| 3,507,733 | 4/1970 | Davidson | 264/338 X |
| 3,522,628 | 4/1970 | Eberle et al. | 264/53 X |
| 3,557,265 | 1/1971 | Chisholm et al. | 264/46.1 |
| 3,616,011 | 10/1971 | Endrizzi | 156/247 X |
| 3,632,841 | 1/1972 | Fortin | 264/1.6 |
| 3,694,292 | 9/1972 | Schippers et al. | 425/97 |
| 3,701,706 | 10/1972 | Giddings et al. | 156/247 X |
| 3,725,191 | 4/1973 | Bloom | 264/338 X |
| 3,848,037 | 11/1974 | Harper | 264/338 X |
| 3,880,691 | 4/1975 | Pannenbecker et al. | 264/173 X |
| 3,907,069 | 9/1975 | Pryor et al. | 425/97 X |
| 3,977,153 | 8/1976 | Schrenk | 264/515 X |
| 3,993,810 | 11/1976 | Bonis | 264/171 X |
| 4,048,428 | 9/1977 | Baird, Jr. et al. | 264/514 X |
| 4,206,165 | 6/1980 | Dukess | 264/45.9 |
| 4,235,834 | 11/1980 | Vetter et al. | 264/290.2 |
| 4,410,587 | 10/1983 | Fair et al. | 156/344 X |

FOREIGN PATENT DOCUMENTS

2337677  3/1979  Fed. Rep. of Germany .
101848  11/1973  German Democratic Rep. .
2087784  6/1982  United Kingdom .

OTHER PUBLICATIONS

McKelvey, James M. *Polymer Processing*, New York, John Wiley and Sons, c 1962, pp. 1–5 and 65–71.
Schenkel, Gerhard *Plastics Extrusion Technology and Theory*, New York, American Elsevier Publishing Company, Inc., c 1966, pp. 71–74.
Wear, vol. 12 (1968), M. Watanabe, M. Karasaw, K. Matsubara, "The Frictional Properties of Nylon", Elsevier Sequoia S.A. Lausanne, pp. 185–191.

*Primary Examiner*—Philip Anderson
*Attorney, Agent, or Firm*—Finnegan, Henderson, Farabow, Garrett & Dunner

[57] ABSTRACT

This invention concerns a process for producing a molded thermoplastic resin by interposing during molding a thermoplastic resin different from the thermoplastic resin to be molded as a skin layer between the die surface and the thermoplastic resin to be molded. A lubricant is provided to lubricate the interface between the die surface and the skin layer. After molding, the skin layer with lubricant is removed.

16 Claims, 22 Drawing Figures

FIG. IE
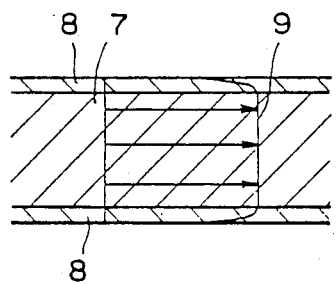
FIG. IF
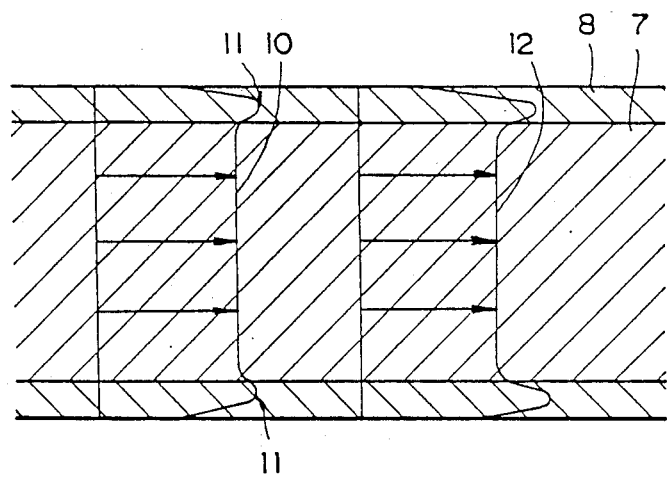

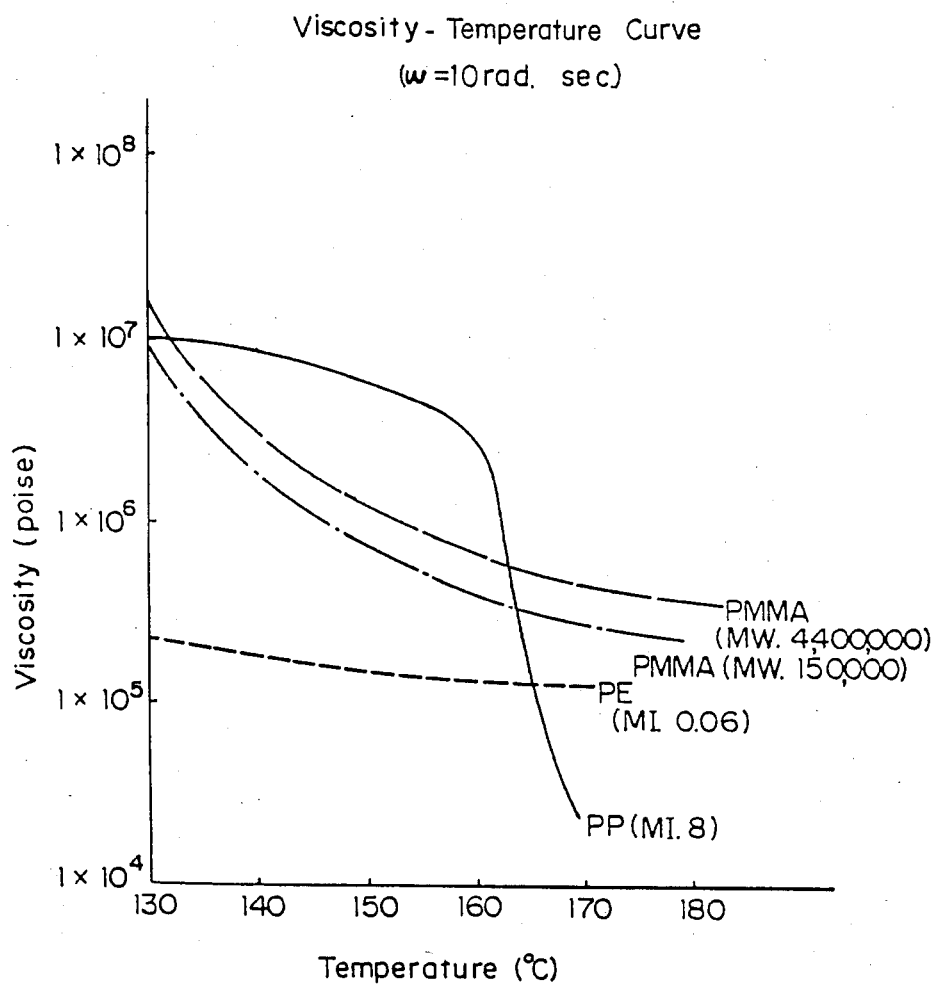

PROCESS FOR PRODUCING MOLDED THERMOPLASTIC RESIN

BACKGROUND OF THE INVENTION

This invention relates to an improved process for producing molded thermoplastic resins.

In the art of extrusion or compression or molding of a thermoplastic resin, it is known that flowability of the resin in the die can be improved by lubricating the inner surface of the die with a lubricant. This is taught with respect to extrusion molding, in U.S. Pat. Nos. 2,597,553 and 2,688,153. By coating the inner surface of a die with a lubricant, flowability of a thermoplastic resin within the die can be markedly improved. As a result, molding at a lower pressure is possible.

Attempting to lubricate the inner surface of a die with a lubricant, however, poses various problems. The greatest problem is that it is difficult to apply the desired thickness of the lubricant uniformly on the inner surface of a die during molding. Consequently, at the portion of the die where the lubricant is applied in too large a quantity, the resin flow will be accelerated, thereby making uniform molding impossible.

Roughening of the inner surface of the die has been suggested as a possible solution to this problem. See U.S. Pat. No. 4,087,222. This approach, however, has not been altogether satisfactory.

U.S. Pat. No. 4,235,834 discloses biaxially oriented molding of a thermoplastic resin under extrusion pressure in a die lubricated on its inner surface with a lubricant. Difficulty in uniformly applying the lubricant on the inner surface of the die during molding, however, causes localized failures of lubricant film which make it difficult to obtain a uniform biaxially oriented molded product. Further, because of the difficulty in uniformly applying a constant thickness of the lubricant, it is difficult to achieve a high degree of stretching. Indeed, only stretching from about 30% to about 120% in each direction can be achieved. In other words, only stretching to an area ration of 1.69 to 4.84-fold is usually possible. Stretching to a 5-fold area ratio or higher is generally not possible.

U.S. Pat. No. 3,632,841 discloses compression molding in a die lubricated on its inner surface with a lubricant. Here too, however, it is diffucult to apply the lubricant uniformly over the inner surface of a die during molding. Consequently, uniform molding is difficult. In order to overcome that problem, U.S. Pat. No. 3,632,841 requires the molding be performed under a low compression at a low stretching rate. In U.S. Pat. No. 3,632,841 biaxially oriented compression molding of an acrylic resin using a lubricant is effected at a low pressing pressure of 300 to 600 psi and at a low lateral flow rate of 0.1 to 72 in./min. Pressing must be conducted under such a low pressure and at such a low flow rate in order to prevent cracking due to poor lubrication on the inner surface of the die. That is, when the pressing pressure is increased, the frictional force between the acrylic resin and the die surface is increased in proportion to the pressing pressure, thereby causing cracking.

It would be highly desirable to improve the lubricating characteristics of the die surface so that good biaxially oriented molding may be performed and a highly oriented molded product may be molded satisfactorily even when molded under a high compression force and at a high stretching rate.

Another problem with prior art processes for extrusion or compression molding with a lubricant is the difficulty in removing the lubricant. There is no simple washing method for removing the lubricant. Moreover, if washing is performed with a large amount of washing liquor, a considerable cost will be incurred in the disposal of liquor.

SUMMARY OF THE INVENTION

It is, therefore, a main object of the present invention to provide a process for producing molded thermoplastic resins which overcome the above-mentioned drawbacks.

It is a more specific object of the present invention to improve lubrication of the inner surface of the die in extrusion or compression molding of thermoplastic resins.

It is a further object of the present invention to improve lubrication of the inner surface of the die in compression molding such that higher compression forces and/or higher stretching rates can be employed.

It is another object of the present invention to improve lubrication of the inner surface of the die in extrusion molding such that a higher stretching ratio is achieved.

Still another object of the present invention is to provide a process for producing molded thermoplastic resins using a lubricant wherein removal of the lubricant is simple and economical.

A further object of the present invention is to improve the moldability of high viscosity resins, such as a ultra-high molecular weight thermoplastic resin, for which extrusion molding has been heretofore difficult.

Another object of the present invention is to improve the moldability of a resin which is required to be extruded in a highly viscous state such as in expanding extrusion molding.

Still another object of the present invention is to improve extrusion molding of a readily heatdecomposable resin such as polyvinylidene chloride.

Still another object of the present invention is to improve the molding of an oriented sheet, pipe or other article with a uniform degree of orientation by extruding a highly viscous resin while stretching in a die.

A further object of the present invention is to provide a molded article of a thermoplastic resin produced as the result of the improvements mentioned above.

Additional objects and advantages of the invention will be set forth in part in the description which follows, and in part will be obvious from the description, or may be learned by practice of the invention. The objects and advantages of the invention may be realized and obtained by means of instrumentalities and combinations particularly pointed out in the appended claims.

To achieve the objects, and in accordance with the purpose of the invention, as embodied and broadly described herein, the invention comprises a process for producing a molded thermoplastic resin in a die comprising the steps of: providing a skin layer thermoplastic resin to be removed, having a thickness of about 1/10 or less of the thickness of a core layer thermoplastic resin to be molded, between the inner surface of die and said core layer thermoplastic resin, interposing lubricant to lubricate the interface between the inner surface of die and said skin layer thermoplastic resin, molding said core layer thermoplastic resin together with the skin layer thermoplastic resin under pressurization at a temperature higher than the glass transition temperatures of said core layer thermoplastic resin; and removing said skin layer from said core layer thermoplastic resin to form a molded article.

BRIEF DESCRIPTION OF THE DRAWINGS

In the accompanying drawings:

FIGS. 1A–1H are schematic illustrations for showing the states of flow in a die;

FIGS. 2A–2D are graphs showing the relationship between temperature and viscosity for various thermoplastic resins and polymers;

DETAILED DESCRIPTION OF THE PREFERRED EMBODIMENTS

Figure 1A:
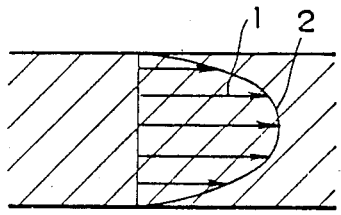

Reference will now be made in detail to the present preferred embodiments of the invention.

In accordance with the present invention, there is provided a process for producing a molded thermoplastic resin in a die comprising the steps of: providing a skin layer thermoplastic resin to be removed, having a thickness of about 1/10 or less of the thickness of a core layer thermoplastic resin to be molded, between the inner surface of die and said core layer thermoplastic resin, interposing lubricant to lubricate the interface between the inner surface of die and said skin layer thermoplastic resin, co-molding said core layer thermoplastic resin together with the skin layer thermoplastic resin under pressurization at a temperature higher than the glass transition temperatures of said core layer thermoplastic resin; and removing said skin layer from said core layer thermoplastic resin to form a molded article.

For purposes of the present invention, the thermoplastic resin used for the final molded article (hereinafter referred to as the "core resin") may be any of the thermoplastic resins generally used for extrusion or compression molding. Examples of such resins are: polystyrene, styrene-acrylonitrile copolymer, ABS resin, polyvinyl chloride, polymethyl methacrylate, polycarbonate, polyester, nylon, polyphenyleneether, polyoxymethylene, polyolefins such as polyethylene or polypropylene or blends, and copolymers of these resins. The core resin used in accordance with the present invention may also be a ultra-high molecular weight thermoplastic resin having a viscosity average molecular weight of 800,000 or more, preferably 800,000 to 8,000,000, more preferably 1,000,000 to 5,000,000, such as polyethylene or polymethyl methacrylate, a readily heat-decomposable thermoplastic resin, such as polyvinylidene chloride, or a thermoplastic resin containing a blowing agent. The core resin used in accordance with the present invention may be a multilayer structure consisting of two or more kinds of thermoplastic resins, if desired.

In accordance with the present invention, the thermoplastic resin used for the skin surface layer (hereinafter referred to as the "skin resin") is interposed between the core resin and a die surface. The thermoplastic resin used as the skin resin has greater flowability in the die than that of the core resin. The greater flowability means a smaller coefficient of kinetic friction with the inner surface of the die than that of the core resin, which is measured at 20° C. temperature according to Wear, 12(1968)185–195, and/or a smaller viscosity than that of the core resin. The skin resin is required to have a viscosity of 5,000 poise or more to provide the requisite strength for removal. When the skin resin slides over the inner surface of a die, the frictional force imposed on the resin and the die surface is proportional to the product of the pressure applied on the skin resin and the coefficient of kinetic friction. Accordingly, as the coefficient of kinetic friction is smaller and the resin pressure is smaller, the frictional force becomes smaller to make the core resin more readily slidable in the die, thus tending to form a plug flow.

The values of the coefficients of kinetic friction of resins vary according to a kind of material constituting a die or temperature for measuring. Generally, the values of the coefficients of kinetic friction of resins relative to the steel at 20° C. temperature can be used as indices in the present invention in order to decide whether greater or smaller, which the values are measured according to the method described in Wear, 12(1968)185–191 under conditions of 20° C. temperature, a sliding speed of 6.2 cm/sec. and a load of 0.83 kg/cm$^2$. These values of various resins are as shown below:

| | |
|---|---|
| Polymethyl methacrylate | 0.57 |
| MMA-MMAmid | 0.58 |
| MMA-St-MAH | 0.58 |
| Polystyrene | 0.37 |
| ABS resin | 0.37 |
| Polyvinyl chloride | 0.22 |
| Polypropylene | 0.30 |
| Nylon 6 | 0.21 |
| Nylon 12 | 0.18 |
| High density polyethylene | 0.14 |

Low density polyethylene, linear low density polyethylene, high density polyethylene, polypropylene, modified polypropylene copolymerized with a small amount of ethylene by random or block copolymerization and polyamides such as nylon 6, nylon 12, nylon 11 and the like have smaller coefficients of friction and are readily slidable through a die and therefore are suitable as the skin resin. In particular, when high density polyethylene, polypropylene or nylon is used as the skin resin on the surface of polymethyl methacrylate having a large coefficient of friction, its effect will markedly be demonstrated.

Each skin layer may be formed to have two or more layers, if desired. In this case, the outer skin resin has a smaller coefficient of kinetic friction with the inner surface of the die than that of the core resin and/or a smaller viscosity than that of the core resin. However, the inner skin resin is free from the above mentioned condition, it is not preferred that the inner skin resin has much different viscosity from those of other resin.

For example, when a skin resin consisting of two or more layers is employed and molded, with the outermost skin layer kneaded with a lubricant, the lubricant will lubricate the die by bleeding without contamination of the core resin. Also, when the same kind of resin as the core resin is desired to be used as the skin resin, a different kind of resin may be used as the layer on the innerside.

The skin resin has a thickness of about 1/10 or less of the thickness of the core resin, and may be in the range of from about 0.01 to about 2 mm, preferably from about 0.05 to about 1 mm. If the skin resin is too thin, no improvement of resin flowability will be obtained. On the other hand, too thick of a skin resin is not economical, since only the core resin is used after removal of the skin resin. Consequently, within the range which will afford the improved resin flowability, it is preferred to use as thin a skin layer as possible. The best thickness for improving resin flowability will vary depending on the viscosity and/or the coefficient of friction with the inner surface of the die and the skin resin. The best thickness may be easily determined by those skilled in this art.

In accordance with the present invention, the skin resin is removed from the molded product after molding. The lubricant attached on the skin layer can be removed at the same time. The present invention can also be utilized to prevent the lubricant from attaching to the molded article. In this case, the skin layer is preferably as thin as possible for economical reasons.

The skin resin, which is to be removed from the core resin after molding, is desired to be readily eliminable. The peel-off strength between the skin resin and the core resin, which may differ depending on the shape of the molded article and the kinds and shapes of the skin and the core, is desired to be small enough to enable separation therebetween easily without causing breaking of the skin. Generally, it may be about 2 kg/25 mm or less (180°, 200 mm/min.). That is to say, the peel-off strength when peeling a skin with about 25 mm of width off a core at an angle of about 180° therefrom at a speed of about 200 mm/min. is preferably less than about 2 kg, more preferably about 1 kg or less. Preferable skin resins are those which are non-adhesive to the core resin after molding.

Low viscosity is desirable during molding to obtain good moldability. However, the viscosity decreases as the polymerization degree of the resin decreases. Consequently, if the viscosity of the skin resin is too low, the skin may be broken on its removal after molding making removal difficult. Accordingly, the skin resin must have a sufficient polymerization degree to maintain the strength necessary for removal. Generally speaking, the skin resin should have a viscosity of about 5,000 poise or more during molding.

The lubricant to be used in the present invention is a fluid having a viscosity during molding of less than about 5,000 poise, preferably about 1,000 poise or less. Examples of such lubricants are fluid paraffins, various silicone oils such as polydimethyl siloxane, various fatty acids and metallic salts thereof such as stearic acid, stearic acid metal salts, etc., glycerine, polyethylene glycol, low molecular weight polyethylene, and mixtures of these fluids. Other lubricants conventionally employed in extrusion or compression molding may also be used.

In accordance with the method for interposing a lubricant between a die surface and a skin resin in the present invention, a lubricant may be spread through a die on the die surface, may be coated on the outermost layer of the skin resin and/or may be kneaded into the outermost layer of the skin resin and permitted to bleed out therefrom during molding. Even if the lubricant applied on the die surface becomes ununiform or localized failures occur, the present invention may still be practiced.

Figure 1B:
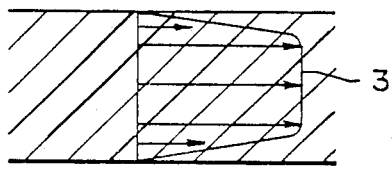

Referring now to the accompanying drawings, FIGS. 1A–1H shows the velocities at respective positions of a thermoplastified thermoplastic resin in a die as the resin flows through a die. When a thermoplastic resin flows at a low velocity, it will exhibit a velocity 1 and a velocity curve 2 as shown in FIG. 1A. When it flows at a high velocity, it will exhibit a velocity curve 3 as shown in FIG. 1B. In FIGS. 1A and 1B, a shearing force is exerted within the resin. Consequently, flow resistance in the flow through the die of a high viscosity resin is very great. The flows of the resin through the die as shown in FIG. 1A and FIG. 1B are not suitable for molding by stretching in a die or for molding of a high viscosity resin.

Figure 1C:
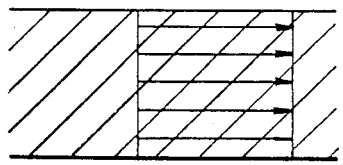
Figure 1D:
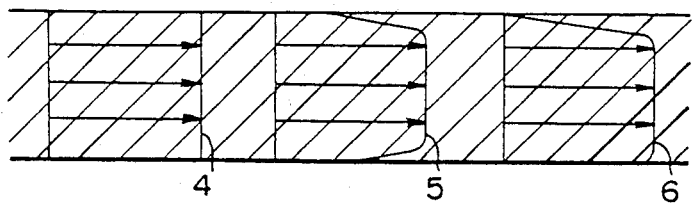

When the die surface is lubricated uniformly and sufficiently with a lubricant, the resin will slide over the die surface to form a state called a "plug flow" FIG. 1C. Because it is difficult to lubricate the die surface uniformly with a lubricant, the lubrication will become uneven and the flow will be greatly disturbed becoming a mixed flow of FIG. 1A or FIG. 1B with FIG. 1C. This is illustrated in FIG. 1D, wherein depending on the positions, the velocity distribution will change, as shown by 4, 5 and 5, to disturb the flow of the resin.

In the present invention, as shown in FIG. 1E, the thermoplastic resin consists of the skin resin 8 and the core resin 7. By using a resin having good flowability properties in the die as the skin resin, the core resin exhibits a stable flow approximating a plug flow and thereby giving a desirable velocity distribution as depicted in FIG. 1E. Preferably a resin having a smaller coefficient of friction with the inner surface of a die and/or a smaller viscosity than that of the core resin will be used as the skin resin. Such a skin resin will create good flowability in the die.

The present invention is further described by referring to FIG. 1F. Even if the inner surface of a die is lubricated with a lubricant, there is frictional resistance between the resin layer and the inner surface of the die which retards flow velocity. However, by using a resin having good flowability in the die as the skin layer, the flow of the skin resin layer will be accelerated thereby cancelling the frictional resistance with the die and stabilizing the flow in the inner core layer of the resin. As a result, the core layer exhibits a velocity distribution 10 approximating plug flow. It is preferred that the portion of the highest velocity 11 should exist at the skin layer. Even when the frictional resistance between the inner surface of the die and the resin layer may be ununiform due to ununiform lubrication with the lubricant, owing to the presence of the skin resin layer, the core resin layer can exhibit a velocity distribution 12 approximating plug flow.

Figure 1G:
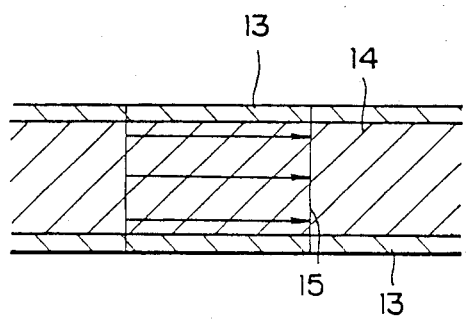
Figure 1H:
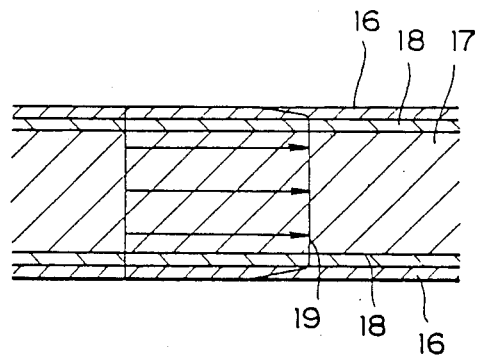

FIGS. 1G and 1H illustrate other preferred embodiments of the present invention.

In FIG. 1G, even if the viscosity of the skin resin 13 is greater than that of the inner resin 14 during molding, so long as the coefficient of friction of the skin resin with the inner surface of the die is sufficiently small, good plug flow 15 as shown in FIG. 1G can be obtained.

Another preferred embodiment of the present invention is the five-layer structure depicted in FIG. 1H. The five-layer structure comprises a skin resin for the first, second, fourth and fifth layers and the core resin for the third layer. In FIG. 1H, when molding is performed under the state where the outer skin resin 16 of the first and fifth layers has a smaller viscosity than the core resin 17 and the inner skin resin 18 of the second and fourth layers has a larger viscosity than the core resin 17 during molding, the flows of the second to fourth layers will become stable plug flow due to good flowability of the outer skin resin 16 to give a preferable velocity distribution 19. Further, since the core resin 17 of the third layer is molded while being contacted with the inner skin resin 18, the surface state of the inner skin resin 18 is transferred onto the surface of the core resin to give a good surface of the core resin layer. When a mirror surface sheet having smooth surface is employed as the inner skin layer of the second and fourth layers, its surface is transferred onto the core resin layer to give a core resin layer having a smooth surface.

FIGS. 2A–2D show the relation between temperature and viscosity for various resins.

Viscosity was measured by means of a DYNAMIC SPECTROMETER RDS-7700 produced by RHOMETRICS Inc. at shear rate of 1 rad./sec and 10 rad./sec.

The resins employed are as follows:

PMMA (MW 4,400,000): polymethyl methacrylate having a weight average molecular weight of 4,400,000;

MMA (MW 150,000): copolymer of methyl methacrylate and methyl acrylate at a weight ratio of 95:5, having a weight average molecular weight of 150,000;

ABS: ABS resin comprising styrene/acrylonitrile/-butadiene = 52/23/25 (weight ratio), MI = 13 (ISO DR1001);

PS: polystyrene, MI = 7.5 (ISO R1113);

PP(MI 0.5): polypropylene copolymerized randomly with 2 wt. % ethylene, MI = 0.5 (ASTM D1238, 230° C.);

PP(MI 4): polypropylene copolymerized randomly with 2 wt. % ethylene, MI = 4 (ASTM D1238, 230° C.);

PE(MI 20): low density polyethylene, MI = 20 (ASTM D1238 190° C.);

PP(MI 8): polypropylene homopolymer, MI = 8 (ASTM D1238 230° C.);

PE(MI 0.06): high density polyethylene, MI = 0.06 (ASTM D1238, 230° C.);

MMA-MAAmide: copolymer of MMA/methacrylamide = 92/8 (weight ratio);

MMA-St-MAH: copolymer of MMA/Styrene/Maleic anhydride = 70/20/10 (weight ratio);

Nylon 12: m.p. 178° C.

Nylon 6: m.p. 225° C.

Figure 2A:
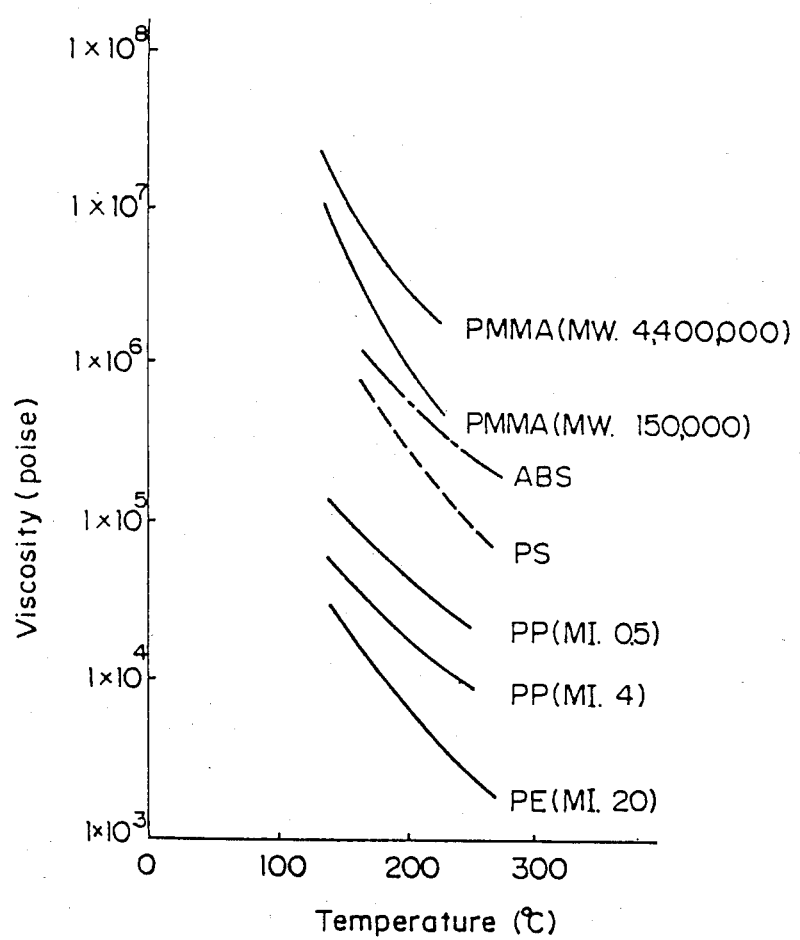
Figure 2B:
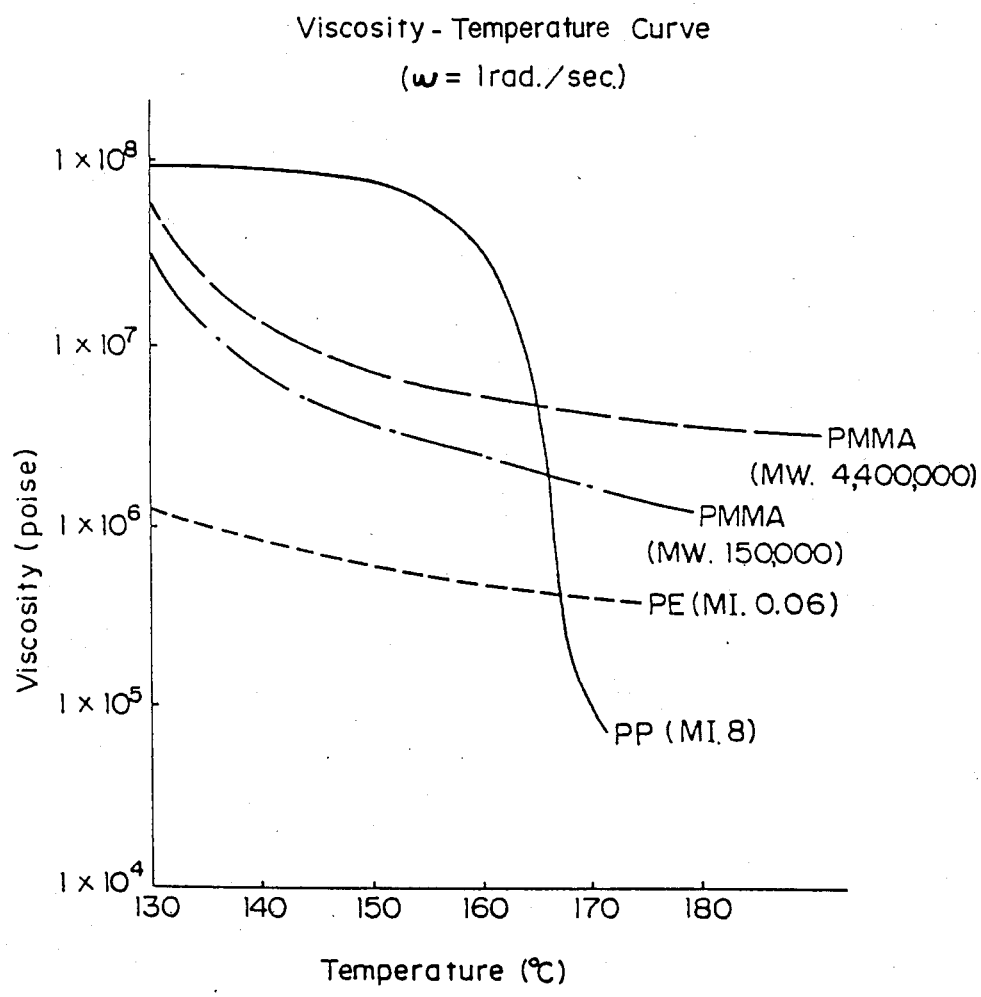
Figure 2D:
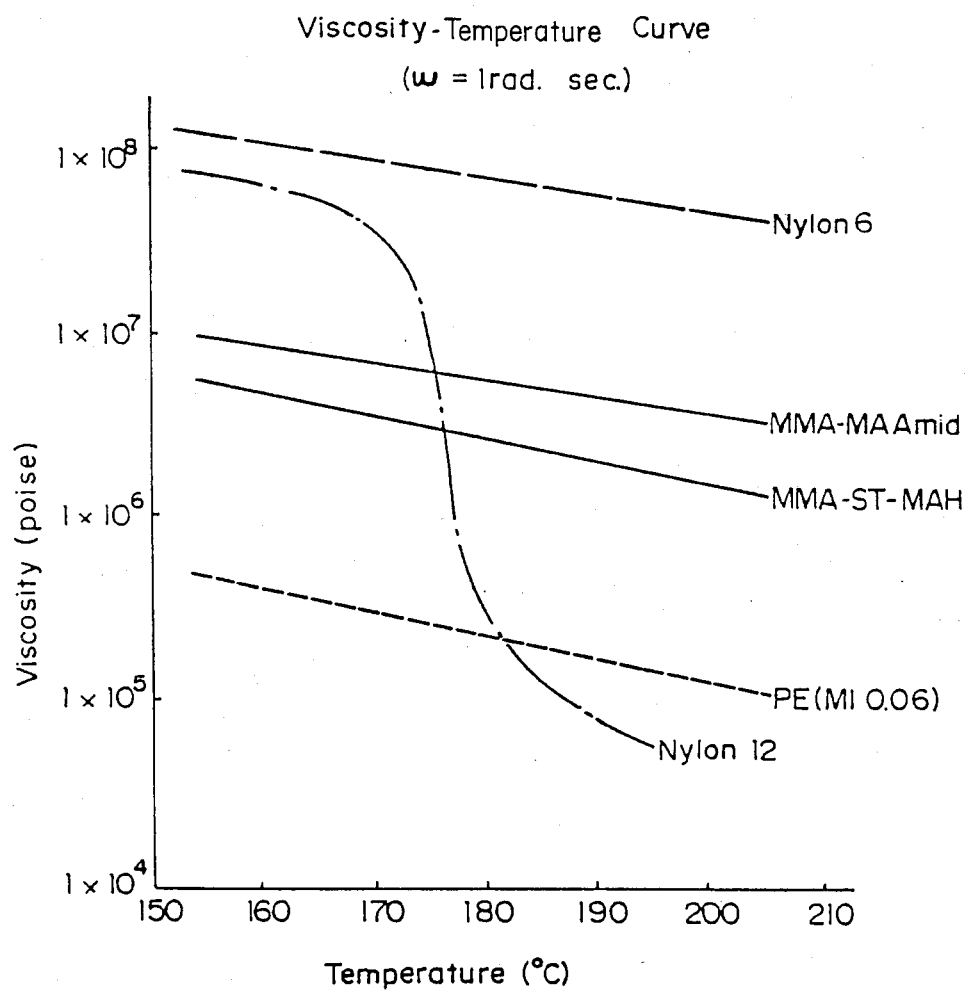

FIG. 2A shows the viscosities measured at low shear rates of 1 rad./sec. or lower. FIGS. 2B and 2D show viscosities measured at a shear rate of 1 rad./sec. FIG. 2C shows viscosities measured at a shear rate of 10 rad./sec. Measurements were conducted by elevating the temperature by 10° C., and viscosity was measured after leaving the sample stand for 15 minutes after reaching the measuring temperature.

FIGS. 3A–3D shows the procedure for molding a biaxially oriented sheet by compression molding in accordance with the present invention.

Figure 3A:
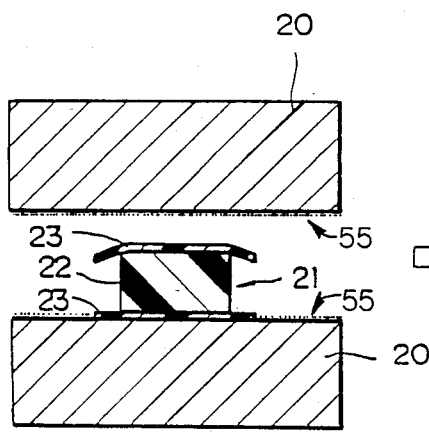
FIGS. 3A–3D are schematic illustrations for showing the procedure of molding a biaxially oriented sheet by compression molding in accordance with the present invention.

In FIG. 3A, a thick preform 21 heated to higher than the glass transition temperature but lower than the melting point of the thermoplastic resin is placed in a compression molding die 20 heated to an appropriate temperature. The thick preform 21 consists of a core resin layer 22 and skin resin layers 23, each skin resin layer having a thickness of 1/10 or less of the thickness of the core resin layer 22 is placed on the upper and lower sides of the core resin layer 22. The inner surface of the compression molding die 20 is lubricated with a lubricant 55 and/or the surface of the skin resin layer 23 is coated with a lubricant.

Figure 3B:
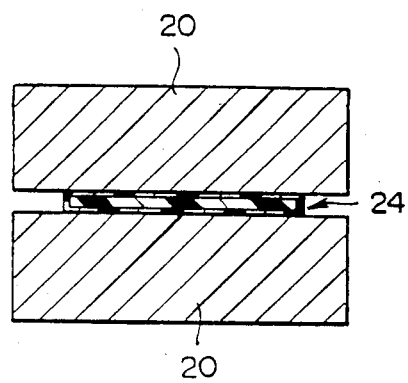

Under this state, compressive force is applied on the compression molding die 20 to compress the thick preform 21, whereby the thick preform 21 is subjected to biaxial orientation as depicted in FIG. 3B. The compression molding die 20 is cooled as such to solidify the molded article 24 by cooling. The molded article is taken out of the die. Then the skin resin is removed from the molded article to obtain a biaxially oriented molded article of the core resin. By using as the skin resin a resin having a smaller viscosity at the molding temperature and/or a lower coefficient of friction with the inner surface of the die than the core resin, a good biaxially oriented molded article is obtained. When a mirror surface sheet having larger viscosity and smaller coefficient of friction with the inner surface of the die and a smooth surface is used as the skin resin, the mirror surface of the skin resin is transferred onto the core resin and, when the skin resin is removed after molding, a biaxially oriented molded article having a smooth surface is obtained.

Figure 3C:
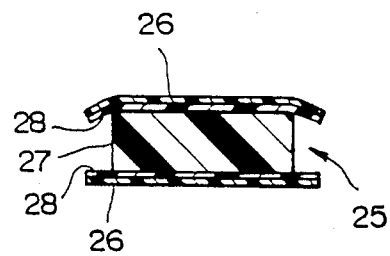
Figure 3D:

FIGS. 3C and 3D show another preferred embodiment of the present invention. In 3C, the thick preform has a five-layer structure, the outer skin resins 26 of the first and fifth layers have smaller viscosity than that of the core resin 27 of the third layer during molding, the inner skin 28 resins of the second and fourth layers have larger viscosity than that of the core resin 27 of the third layer during molding. The skin resins 26 and 28 are respectively placed on the upper and lower sides of the core resin 27. Compression molding of said five-layer thick preform 25 is conducted in a similar manner to that described above with reference to FIGS. 3A and 3B to give a biaxially oriented sheet 29 as depicted in FIG. 3D. After molding with a mirror surface sheet with a smooth surface as the second and fourth layers, the skin resins of the first, second, fourth and fifth layers are removed to give a biaxially oriented sheet of the core resin with a smooth and mirror-like surface. For example, when compression molding is performed by the above-described process using PE sheet for the first and fifth layers, mirror surface sheets of PP, Nylon 6 or Nylon 12 for the second and fourth layers and PMMA for the third layer, with heating in the range from 130° to 160° C., a biaxially oriented sheet of PMMA with a good surface is obtained.

It is preferred that no air should remain between the respective layers of the three-layer or five-layer preform shown in FIGS. 3A–3D. For this purpose, it is preferred to vacuum package the core resin with the skin resin sheets. This can be accomplished by hermetically packaging the core resin within the skin resin sheets to have both resins closely contacted with each other before molding. The present invention is particularly effective for compression molding of a biaxially oriented sheet having a thickness of 1 mm or more with a stretching degree in terms of area ratio of 2 to 15-fold, more preferably 3 to 10-fold. The present invention is especially effective for compression molding a biaxially oriented sheet with a thickness of 1 to 10 mm.

The temperature higher than the glass transition temperature and lower than the melting point which should be used as the biaxially stretching temperature, in accordance with the present invention may be any temperature generally suitable for orientation of a synthetic resin. The best temperature will vary depending on the resin used. Preferably the temperature is a temperature lower than the molding temperature conventionally employed for injection or extrusion molding. More preferably the temperature is at least 30° C. lower than the molding temperature and 10° C. higher than the glass transition temperature.

Figure 4:
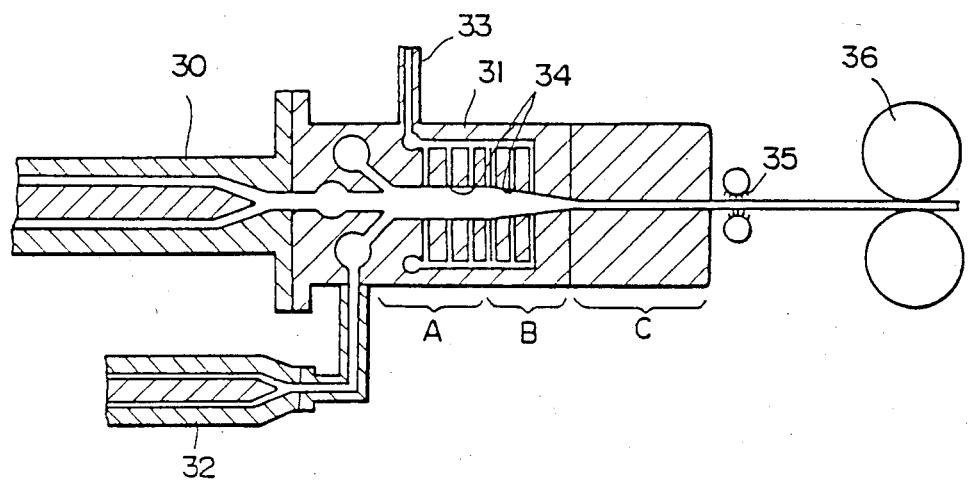
FIG. 4 and FIG. 7 are sectional views of portions of devices for extrusion molding biaxially oriented sheets by the process of the present invention.

FIG. 4 shows a device for extrusion molding of a biaxially oriented sheet in accordance with the present invention. In FIG. 4, the extruders 30 and 32 are directly connected to the die 31, and the core resin thermoplastified in the first extruder 30 is pressurized in the shape of a sheet into the die 31. The skin resin is thermoplastified in the second extruder 32 and pressurized into the die 31 to form a skin, and a thick molded product shaped in a three-layer sheet is formed at portion A of die 31. The portion A of die 31 is cooled, and the thick molded product shaped in a three-layer sheet is cooled to a temperature higher than the glass transition temperature and lower than the melting point of the thermoplastic resins. The portion A must be long enough to permit substantially uniform cooling of the resin. Uniformization of the temperature by heating slightly after cooling may be conducted, if necessary.

Along the passage at portion A, the device has equipment for oozing out a lubricant in order to lubricate the interface between the thick molded product and the die surface. Under high pressure the lubricant is led through the lubricant inlet 33 to a plurality of oozing outlets 34 to be oozed therethrough onto the die surface, whereby the interface between the molded product surface and the die surface is lubricated with the lubricant.

Figure 5:
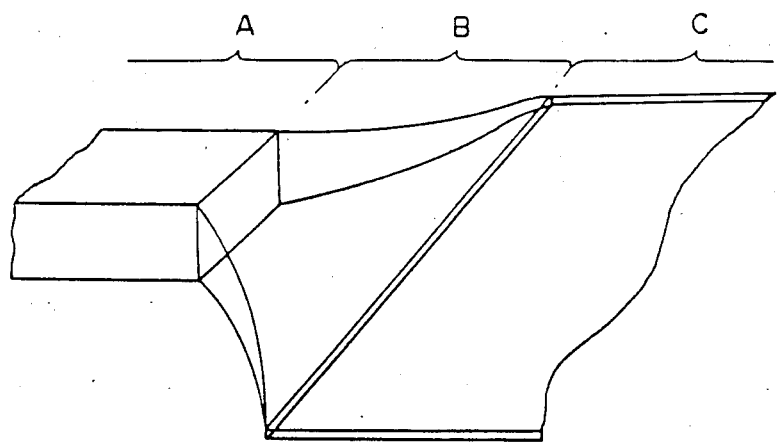
FIG. 5 is an enlarged view of the stretched portion of a biaxially oriented sheet when it is molded by means of the device shown in FIG. 4.

The oozing outlet 34 for the lubricant is made of a material having small slits or minute connected pores such as sintered metals, and the lubricant is oozed out through small slits of minute pores. The core resin molded product cooled to a temperature higher than the glass transition temperature and lower than the melting point of the thermoplastic resins, will become the so called plug flow, such that the core resin flows at substantially the same velocity within the die. Subsequently, at the portion B of the die, the molded product in plug flow is compressed to become biaxially oriented. The portion B of the die has a structure to make the resin thickness smaller. FIG. 5 shows the changes in flow of the molded product at the portion B. The molded product, while being in state of plug flow, is compressed simultaneously in the flowing direction and the direction perpendicular thereto to become biaxially oriented. The force for compressing the molded product is supplied by the extrusion force from the extruder. The biaxially oriented molded product is further cooled at the portion C of the die, preferably to a temperature lower than the glass transition temperature, before being discharged from the die. The discharged product may be further cooled with cold water 35, if desired, and passed between rubber rollers to form a biaxially oriented sheet. For uniformization of the sheet discharged from the die, it is desirable to suppress discharging of the sheet by controlling the rotation of the rubber rollers 36 to create resistance against the progress of the sheet. By removing the skin layer of the sheet after it comes out from the rubber rollers, a biaxially oriented sheet of the thermoplastic core resin is obtained. This extrusion molding process is effective particularly for molding biaxially oriented sheets having a thickness of about 1 mm or more, especially a thickness of about 1 to about 10 mm, and having a stretching degree in terms of area ratio of about 3 to about 15, preferably of about 5 to about 10.

The molded biaxially stretched sheet can be subsequently further formed into a corrugated sheet, if desired. The process for making such a corrugated sheet is also intended to be within the scope of the present invention.

Figure 6:
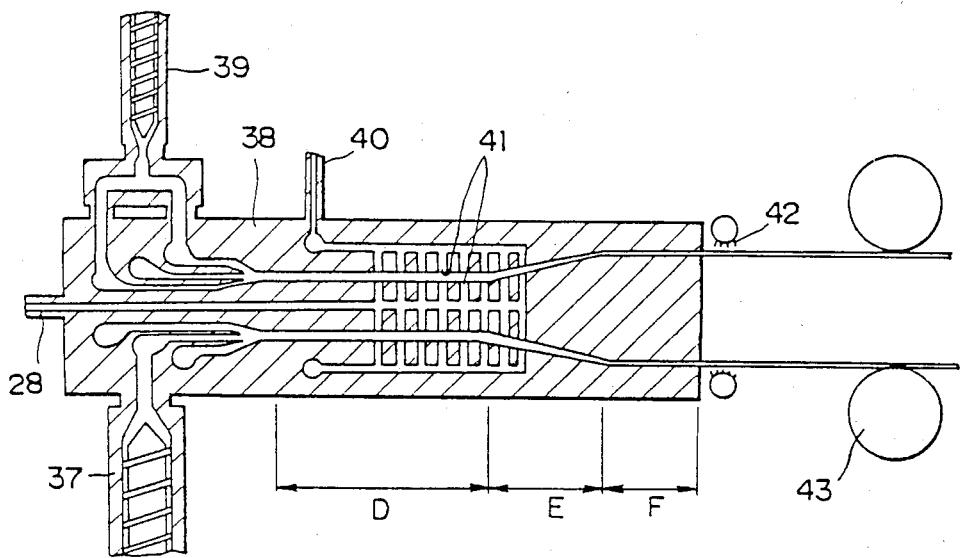
FIG. 6 is a sectional view of a portion of a device for extrusion molding biaxially oriented pipe by the process of the present invention.

FIG. 6 shows a process for extrusion molding a biaxially oriented pipe in accordance with the present invention. In FIG. 6, the core resin thermoplastified in the first extruder 37 is pressurized into the die 38 in the shape of a pipe. The skin resin extruded from the second extruder 39 is pressurized into the die 38 to cover the inner wall and the outer wall of the core resin pipe thereby forming the inner skin and the outer skin of the core resin pipe to create a three-layer structure. At portion D of the die 38, the pipe is formed with a constant thickness and cooled to a temperature higher than the glass transition temperature and lower than the melting point of the resin. Portion D of die 38 must be long enough to allow for sufficient cooling of the resin. For uniform cooling, it is preferred to provide a cooling section and a heating section at portion D.

Along the pasaage at portion D, equipment is provided for lubricating the interface between the surfaces of the thick pipe and the die surfaces with a lubricant. Both outer surface and inner surface of the pipe are lubricated with the lubricant. A lubricant is led from the lubricant inlet 40 to a plurality of oozing outlets 41 on the outer surface and inner surface of the pipe to be oozed out onto the pipe surfaces. In that manner the interface between the pipe and the die surfaces is lubricated with the lubricant.

The thick pipe of core resin cooled to a temperature higher than the glass transition temperature and lower than the melting point of the resin, will become the so called plug flow, such that the core resin flows at substantially the same velocity within the die. Subsequently, at portion E of the die, the pipe in plug flow is expanded in diameter thereby becoming thinner and biaxially oriented. The thick pipe, while being in state of plug flow, is compressed by the extrusion force from the extruder simultaneously in the flowing direction and the direction perpendicular thereto to become biaxially oriented. The biaxially oriented pipe is further cooled at the portion F of the die, preferably to a temperature lower than the glass transition temperature, before being discharged from the die.

The discharged pipe may be further cooled with cold water 42, if desired, and passed between rubber rollers 43, to form biaxially oriented pipe. For uniform extrusion of the pipe, it is desirable to provide a resistance against the progress of the pipe by controlling the rotation of the rubber rollers 43 to create a counterpressure against the pipe discharged from the die.

Figure 7:
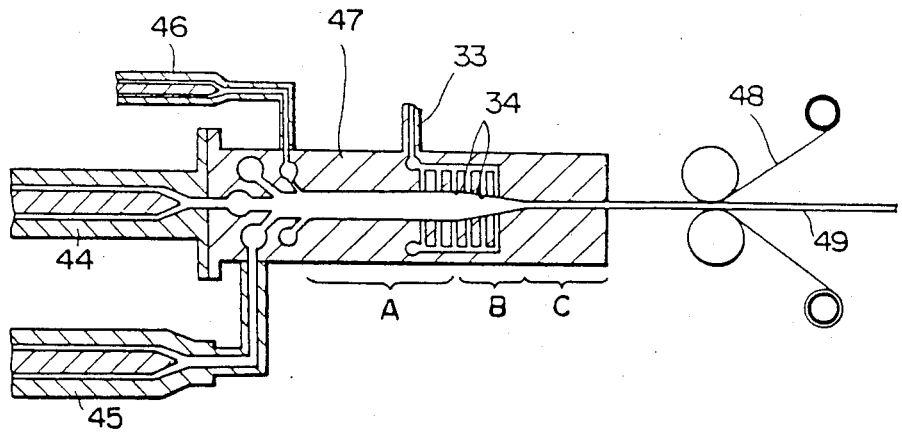

In accordance with the present invention, a molded product of three or more layers can also be molded, if desired. According to a process similar to that described with reference to FIG. 4 and FIG. 5, orientation molding of a five-layer product comprising three kinds of resins can be practiced by means of a device as shown in FIG. 7. In FIG. 7, the first resin thermoplastified in the first extruder 44 is pressurized into the die 47, and the second resin thermoplastified in the second extruder 45 is pressurized into the die 47 to become the surface layers on the first resin, thus forming a three-layer structure. The third resin is thermoplastified in the third extruder 46 and pressurized into the die 47 to form the skins to form a five-layer structure. The skins formed with the third resin have a viscosity smaller than the core formed by the first and second resins during molding. Each of the skins has a thickness of about 1/10 or less the thickness of the core, and the skins are readily removed from the core after molding. Then, similarly as in FIG. 4 and FIG. 5, the inner surface of the die is lubricated with a lubricant, the molded product is cooled and subjected to biaxial stretching, followed by further cooling, and discharging from the die. The skins 48 are removed from the five-layer biaxially stretched sheet to obtain a good three-layer biaxially stretched sheet with no lubricant adhered thereon.

In accordance with the present invention, compression molding of a three-layer biaxially stretched sheet by molding a five-layer biaxially stretched sheet and removing the skins from the molded product is also possible.

When a five-layer biaxially stretched sheet is molded by either extrusion or compression molding, the resin of the inner core (third layer) should have a higher softening temperature and/or a higher viscosity during molding as compared with the resin of the outer cores (second and fourth layers). In other words, the resin of the inner core (third layer) should desirably employ a heat resistant resin, having a greater molecular weight and/or a higher softening temperature, as compared with the resin of the outer cores (second and fourth layers). This is because the central portion of the resin tends to flow forwardly and disturb the plug flow. Using a resin having a greater viscosity and smaller flowability for the inner core will solve this problem by stabilizing the plug flow of the resin.

Uniaxially oriented extrusion molding may also be conducted in accordance with the process of the present invention. That is, excellent molding of mono-axially oriented round rods and others can be accomplished by practice of the present invention. By molding monoaxially oriented round rods of polyoxymethylene, nylon or polyethylene-terephthalate in accordance with the present invention and then ultra-stretching the rods according to the drawing method, strong filaments can be obtained.

The present invention is also applicable to various extrusion molding processes other than orientation molding. Some examples are set forth below.

For extrusion molding of an expanded product, it is known to extrude a resin having an appropriate viscosity and containing a blowing agent uniformly dispersed therein, through a die into the air. There is a certain viscosity range suitable for expansion molding and it has been taught that it is essential to extrude while maintaining the viscosity within this range. If the viscosity is below the appropriate viscosity range, then the blowing gas will break the expanded cells to be dissipated into the air. If the viscosity is above the appropriate viscosity range, the extrusion through an extruding die will become difficult and the expanding force of the blowing gas will become ineffective.

In the case of polystyrenes, the viscosity change with temperature is gentle and the viscosity for expansion molding can be brought to an appropriate region by controlling adequately the temperature. However, in the case of resins such as polypropylene or polyethylene, which are abruptly changed in viscosity with temperature, it has been difficult to bring the viscosity to an appropriate range for expansion by temperature control. In the prior art, modification of the viscosity change with temperature of polypropylene or polyethylene has been accomplished by intermolecular crosslinking the polypropylene or polyethylene. Such crosslinking is effected by irradiation with electron beam or addition of a chemical crosslinking agent. Such crosslinking creates various problems and increases processing costs. Accordingly, it has been desired to perform stable extruding expansion molding without carrying out the crosslinking reaction.

The present inventor has made various studies and consequently found that the molding method of the present invention is very suitable for extruding expansion molding. That is, by use of the process of the present invention, extrusion of a highly viscous resin is possible. That is, a highly viscous resin containing a large amount of a blowing agent can be extruded into an atmosphere under the atmospheric pressure or into an atmosphere under reduced pressure to effect excellently extruding expansion molding.

Since extrusion under highly viscous state can be easily done, the region for uniformizing the temperature control of the resin can be elongated to make the resin temperature uniform, whereby uniform and good expanded products can be obtained.

Further, the present invention can also be applied to ultra-high expansion molding with an expansion ratio of 50-fold or higher. This has also been difficult in the extruding expansion molding of the prior art. Since extrusion is possible under the state of greater resin viscosity, the resin can be extruded stably with a larger quantity of blowing agent loaded in the resin to enable extrusion molding of an expanded product having a high expansion ratio.

Figure 8:
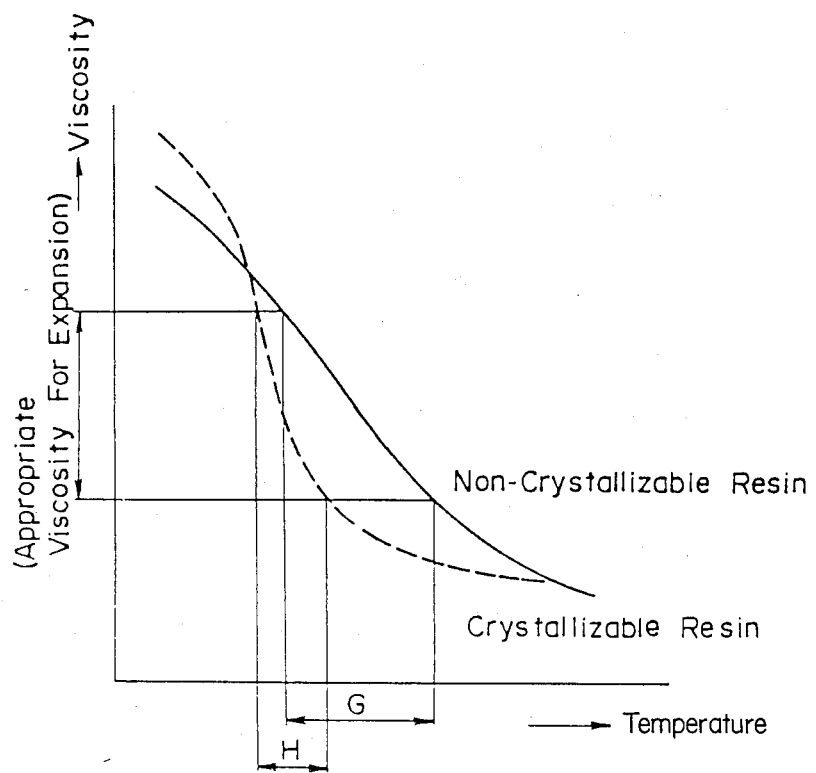
FIG. 8 is a graph showing the relationship between viscosity and temperature for various resins.
Figure 9:
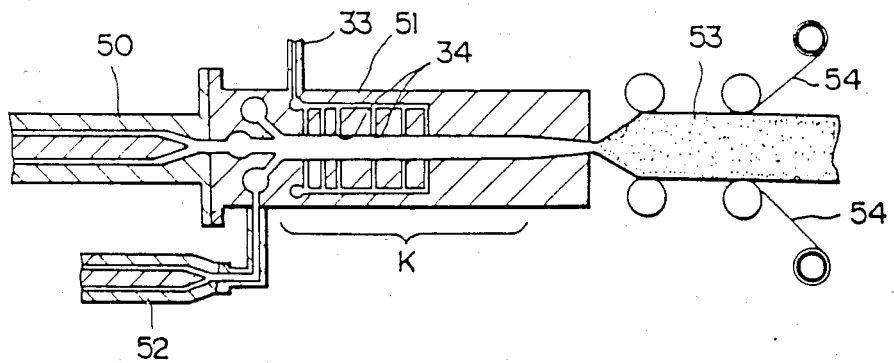
FIG. 9 is a sectional view of a portion of a device for extrusion molding an expanded product by the process of the present invention.

Referring now to FIG. 8 and FIG. 9, expanding extrusion molding in accordance with the present invention is described in greater detail.

FIG. 8 is a graph showing the relationship between viscosity and temperature for crystallizable resins such as polyethylene or polypropylene and non-crystallizable resins such as polystyrene. As can be seen from the graph, a crystallizable resin which will undergo abrupt change in viscosity in the appropriate viscosity range for expansion, has a very small temperature range H at which the viscosity is suitable for expansion. In contrast, the appropriate temperature range G for expansion for the non-crystallizable resin is greater and therefore expansion molding is easier. The present invention can be used for extruding expansion molding of a resin for which the appropriate temperature range for expansion is small.

FIG. 9 shows a device for extrusion molding of an expanded product according to the process of the present invention.

In FIG. 9, a thermoplastic core resin (in the present invention, preferably a crystallizable resin) containing a blowing agent is thermoplastified in the first extruder 50, cooled as far as possible to a temperature suitable for expansion and then pressurized into the die 51. The skin resin for covering the core resin is extruded from the second extruder 52 and pressurized into the interface between the die surface and the core resin to cover the core resin. The die surface is lubricated with a lubricant.

The whole resin is controlled to a uniform appropriate temperature for expansion at the portion K of the die. For controlling both the skin portion and the core portion of the resins to a uniform appropriate temperature for expansion, it is necessary to use a sufficiently long length of the portion K. The pressure loss occurring through the portion K, however, is generally great due to the considerably high viscosity of the resins. In the present invention, the pressure loss through the portion K can be made markedly smaller by the skin resin coated with the lubricant and therefore the portion K can be made sufficiently long. As a result, the expandable resin is controlled to a uniform appropriate temperature for expansion and can be extruded. The extruded expandable resin is formed into an expanded product 53 and the thin skin resin 54 is removed.

A preferred expandable resin used in the present invention are various compositions of polyethyleneterephthalate, having an intrinsic viscosity [η] of about 0.9 or higher, preferably about 1.0 or higher, as measured in a solvent mixture of phenol/tetrachloroethane at a weight ratio of 60/40, formulated with various blowing agents. The present invention is also applicable for expansion molding of nylon and nylon-modified resins.

The blowing agents used in accordance with the present invention may include various physical blowing agents and chemical blowing agents. Examples of suitable blowing agents include: hydrocarbon compounds such as propane, butane, pentane, hexane and the like, chlorinated hydrocarbon compounds such as chloromethane, dichloromethane and the like, various Freons, azodicarboxylic acid amide and sodium bicarbonate. Other suitable blowing agents may also be used.

The following is another example of an application of the present invention.

Molded products of a ultra-high molecular weight polyethylene having a viscosity average molecular weight of 800,000 or more have excellent abrasion resistance, lubricating characteristics, impact resistance, chemical resistance and sound absorbing characteristics. However, they have poor moldability properties and no satisfactory molded product thereof has heretofore been obtained. Rather they have had to have been molded by compression molding of a powder, ram extrusion molding or calendering. The extrusion molding process of the present invention enables extrusion molding of a highly viscous resin, and therefore it can extrude a highly viscous mass of a ultra-high molecular weight polyethylene. Indeed the molding process of the present invention is suitable for molding various ultra-high molecular weight materials, such as polyethylene, polypropylene, ABS resins, all of which have been too difficult to mold in the past.

To permit a ultra-high molecular weight thermoplastic resin to flow in a laminar flow in an extrusion die, a very great extrusion pressure has heretofore been required. However, when a high extrusion pressure is exerted, melt fractures and the like, may be generated creating a poor extruded product in many cases.

According to the process of the present invention, wherein the die surface is lubricated with a lubricant during molding, and extrusion molding is performed using a ultra-high molecular weight resin as the core and a low viscosity resin, etc. as the skin, the ultra-high molecular weight resin can be flown in state of plug flow through the die. This allows the extrusion pressure to be lowered to a great extent to give good molded products. The present invention makes it possible to extrude a ultra-high molecular weight resin into sheet, pipe, profile shape products and other products heretofore unattainable. With reference to FIG. 4 and FIG. 5, continuous extrusion molding of a ultra-high molecular weight polyethylene sheet in accordance with the present invention is described. In FIG. 4, a ultra-high molecular weight polyethylene is thermoplastified in the first extruder 30, and a skin resin such as of nylon is thermoplastified in the second extruder 32, and both are pressurized into the die 31, wherein a three-layer structure having the ultra-high molecular weight polyethylene as the core is formed. The thickness of each skin resin is controlled to about 1/10 or less of the thickness of the core resin. A lubricant under high pressure is led through the lubricant inlet 33 to a plurality of oozing outlets 34 to be oozed out onto the die surface, thereby lubricating the interfaces between the die surface and the skins. The ultra-high molecular weight polyethylene flows in a plug flow through the die and is molded within the die as shown in FIG. 5 under relatively lower pressure and discharged as a sheet out of the die. The temperature of the ultra-high molecular weight polyethylene within the die 31 may be either higher or lower than the melting point of the ultra-high molecular weight polyethylene.

Another benefit of the present invention is that it can be used for molding resins susceptible to thermo degradation. Readily heat-decomposable resins which are susceptible to thermo decomposition such as polyvinyl chloride or polyvinylidene chloride are required to be molded at temperature as low as possible. Heretofore, these resins are molded at lower temperatures, by lowering their viscosities with addition of a large amount of thermal stabilizers and plasticizers for improvement of moldability. According to the process of the present invention, molding under highly viscous state may be possible and therefore molding at lower temperatures can be conducted with reduced amounts of stabilizers and plasticizers.

The present invention can also be used in molding polyphenylene ethers. Polyphenylene ethers are poor in molding processability and molded generally as a blend with polystyrene or other materials for improvement of flowability. However, blending of polystyrene results in lowering heat resistance, flame retardancy, electrical characteristics, etc. The present invention may be employed to mold difficult polyphenylene ether into sheets or other articles.

In the present invention, the term "during molding" refers to the stage when the resin is molded in the die into the shape of a desired molded article. For example, in biaxially oriented extrusion molding, it is the stage for biaxial orientation, namely the molding stage of the portion B in FIG. 4. In expanding extrusion molding, it is the stage from the resin cooling portion to the outlet portion of the die. In molding a readily heat decomposable resin, it is the stage having the highest temperature within the die. In extrusion molding of a ultra-high molecular weight resin, it is the stage when the resin is molded into the shape of the desired molded article from the central portion to the outlet portion of the die. In the case of molding a wide sheet, it is the stage of widening the sheet.

In the present invention, it is particularly effective to use a die having an inner surface onto which is applied a lining of a solid material having excellent lubricating characteristic such as polytetrafluoroethylene. As the solid material excellent in lubricating characteristic, there may suitably be employed various fluorinated hydrocarbon polymers such as polytetrafluoroethylene and the like which are not softened at the molding temperature for the thermoplastic resins to be used in the present invention. Coating of the inner surface of a die according to the fluorine resin processing as disclosed in U.S. Pat. No. 3,279,936 is particularly suitable for the present invention, since it is very good in abrasion resistance during molding.

According to the process of the present invention, molding under highly viscous state has been made easier and more economical. Biaxially oriented molding, expansion molding, molding of a ultra-high molecular weight polymer and molding of a readily heat-decomposable resin can be performed excellently by the process of the present invention.

The products made by the process of the present invention are used in various fields. For example, biaxially oriented PMMA is used as a conventional glazing material and as a safety glazing material for windows of vehicles, airplanes, buildings and for protecting walls against wind. Biaxially oriented pipe is used for water supply. Ultra-high molecular weight polyethylene sheet is used as a lining material in various fields, and as an expanded product for shock absorbing material and thermal insulating materials.

EXAMPLE 1

Using the respective resins as shown below, biaxially oriented molding was performed according to compression molding by means of the device as shown in FIG. 3.

PMMA: 20 mm thick sheet of PMMA (MW 4,400,000)
PP: 0.2 mm thick sheet of PP homopolymer with MI 8, having smooth mirror surfaces at both front and back sides
PE: 0.2 mm thick sheet of high density PE with MI 0.06, having smooth mirror surface at both front and back sides
Nylon 6: 0.1 mm thick sheet of nylon 6 (m.p. 225° C.) having smooth surface Molding was performed with the use of PMMA or combinations of PMMA with other resins selected from those as shown above, namely:
(A): PMMA
(B): three layers of PE/PMMA/PE
(C): three layers of PP/PMMA/PP
(D): three layers of Nylon 6/PMMA/Nylon 6
(E): five layers of PE/PP/PMMA/PP/PE Each PMMA of (B)–(E) was vacuum-packaged by these thin skin resin sheets.

The inner surfaces of the compression die were lubricated with a lubricant, polydimethyl siloxane, and the die was heated to 150° C. The resin materials of (A)–(E) were sandwiched between iron plates heated at 150° C. for 10 minutes to be elevated in temperature. The surface temperature of the materials was found to be 145° C. The materials in the die were compressed to 4 mm thickness and cooled as such to mold a biaxially oriented sheet stretched to 5-fold in terms of thickness ratio. The resin temperature during compression molding was 140° to 150° C. The skin resins were removed and the surface state of each PMMA sheet was observed. The following Table shows the minimum compression force necessary per 1 cm$^2$ of biaxially oriented sheet and the surface state of the sheet.

TABLE 1

| Sample | Minimum compression force (kg/cm$^2$) | Surface state |
| --- | --- | --- |
| (A) | 110 | trace of extruded lubricant seen on the whole surface, and surface failures occur locally due to lubricant film cutting |
| (B) | 60 | some surface concavo-convexes seen |
| (C) | 80 | smooth surface |
| (D) | 90 | smooth surface |
| (E) | 60 | smooth surface |

For Sample (A), high compression force was necessary for molding and it must be washed after molding for removal of the lubricant on the sheet surface. The sheet surfaces of (C), (D) and (E) were found to be smooth with the sheet surface of PP being transferred. The minimum necessary compression force was found to be smaller in (B), (C), (D) and (E), indicating that the flowability in the die of the multi-layer materials was improved. (B), (C), (D) and (E) are products produced according to the process of the present invention, and they are clearly improved in moldability and also have good sheet surfaces. Among them, (E) is the best. The properties of the sheet of (E) are shown in the Table below, as compared with the non-oriented PMMA sheet.

TABLE 2

| Properties | Measuring Method | Unit | Sheet of (E) | Non-oriented PMMA |
| --- | --- | --- | --- | --- |
| Tensile strength | ASTM D 638 | Kg/cm$^2$ | 910 | 760 |
| Elongation | ASTM D 638 | % | 26 | 5 |
| Flexural strength | ASTM D 790 | Kg/cm$^2$ | 1,450 | 1,200 |
| Flexural modulus | ASTM D 790 | Kg/cm$^2$ | 32,000 | 35,000 |
| Izod impact strength (notched) | ASTM D 256 | Kg · cm/cm | 3.3 | 2 |
| Falling dart impact strength*[1] | Height: 1 m Missile: ⅜ inch R | Kg · cm | 400 | 30 |
| Rockwell hardness | ASTM D 785 | M scale | 105 | 105 |
| Heat resistance | ASTM D 648 | °C. | 99 | 105 |
| Weathering resistance | | | Good | Good |

*[1]Disc of sheet of 5 inch diameter is fixed at its circumference and missile is fallen naturally on its center.

The sheet (E) molded according to the process of the present invention exhibits marked improvement of impact strength, while maintaining excellent properties of PMMA sheet.

EXAMPLE 2

Biaxially oriented molding was conducted similarly as in Example 1 by using various resins as shown below.
MMA-MMAmid: 20 mm thick sheet of a copolymer of MMA(92 wt. %) and methacrylamide (8 wt. %)
MMA-St-MAH:20 mm thick sheet of a copolymer of MMA (70 wt. %), styrene (20 wt. %) and maleic anhydride (10 wt. %)
Nylon 12: 0.1 mm thick sheet of nylon 12 (m.p. 178° C.), having smooth surface Nylon 6: 0.1 mm thick sheet of nylon 6 (m.p. 225° C.), having smooth surface PE: 0.2 mm thick sheet of high density PE of MI 0.06.

Molding was performed with the use of the multi-layer materials selected from the above resins as follows:

(F) MAA-MAAmid
(G) PE/MMA-MAAmid/PE
(H) PE/Nylon 12/MMA-MAAmid/Nylon 12/PE
(I) PE/Nylon 6/MMA-MAAmid/Nylon 6/PE
(J) MMA-St-MAH
(K) PE/MMA-St-MAH/PE
(L) PE/Nylon 12/MMA-St-MAH/Nylon 12/PE
(M) PE/Nylon 6/MMA-St-MAH/Nylon 6/PE Each acrylic resin of (G)–(I) and (K)–(M) was vacuum-packaged by these thin skin resins.

The inner surfaces of the compression die were lubricated with a lubricant, polydimethyl siloxane, and the die was heated to 170° C. The resin materials of (F)–(M) were sandwiched between the iron plates heated at 170° C. for 10 minutes to be elevated in temperature. The surface temperature of the materials was found to be 165° C. The materials in the die were compressed to 4 mm thickness and cooled as such to mold a biaxially oriented sheet stretched to 5-fold in terms of thickness ratio. The resin temperature during compression molding was 160° to 170° C. The skin resins were removed and the surface state of each of MMA-MAAmid and MMA-St-MAH sheets were observed. The following Table shows the minimum compression force necessary per 1 cm$^2$ of biaxially oriented sheet and the surface state of the sheet.

TABLE 3

| Sample | Minimum compression force (kg/cm$^2$) | Surface state |
| --- | --- | --- |
| (F) | 110 | trace of extruded lubricant seen on the whole surface, and surface failures occur locally due to lubricant film cutting |
| (G) | 60 | some concavo-convexes seen |
| (H) | 60 | smooth surface |
| (I) | 70 | smooth surface |
| (J) | 110 | trace of extruded lubricant seen on the whole surface, and surface failures occur locally due to lubricant film cutting |
| (K) | 70 | some surface concaro-convexes seen |
| (L) | 60 | smooth surface |
| (M) | 70 | smooth surface |

For (F) and (J), high compression force was necessary for molding and they must be washed after molding for removal of the lubricant on the sheet surface. The sheet surfaces of (H), (I), (L) and (M) were found to be smooth with the sheet surface of the skin resin being transferred. The minimum necessary compression force was found to be smaller in (G), (H), (I), (K), (L) and (M), indicating that the flowability in the die of the multi-layer materials was improved. (G), (H), (I), (K), (L) and (M) are products produced according to the process of the present invention.

EXAMPLE 3

By means of the device shown in FIG. 4, biaxially oriented sheet was molded according to extrusion molding. As the core resin, an acrylic resin of a copolymer of methyl methacrylate and methyl acrylate (methyl acrylate 5 wt. %, weight average molecular weight 150,000) was employed, as the skin resin a low density polyethylene (MI 20) and as the lubricant polydimethyl siloxane. The core resin and the skin resin were extruded from the first extruder and the second extruder, respectively, formed into a thick three-layer of 20 mm thick core and 1 mm thick skins at the portion A in the die, and further cooled to 150° C. In portion A, the lubricant was oozed out at the interface between the surfaces of the thick three-layer molded product and the inner surface of the die. At the portion B in the die, 5-fold biaxial stretching was effected, and the stretched sheet was cooled at the portion C to obtain a biaxially oriented three-layer sheet with a thickness of 4 mm. After molding, the polyethylene of the surface layers was removed to give good biaxially oriented acrylic sheet with no lubricant adhered. When biaxially oriented molding was conducted similarly with a single layer acrylic resin without the skin layers of polyethylene, the flow within the die was found to be unstable, and the resultant biaxially oriented sheet was found to have irregularities based on the poor flowability, thus giving no uniform biaxially oriented sheet. Further, the sheet must be washed for removal of the lubricant on the sheet.

EXAMPLE 4

By means of the molding device as shown in FIG. 7, a biaxially oriented sheet is molded according to extrusion molding without discharging the lubricant from the lubricant inlet 33 to the oozing outlet 34. As the core resin, an acrylic resin of a copolymer of methyl methacrylate and methyl acrylate (methyl acrylate 5 wt. % weight average molecular weight 150,000) is employed, as the outer skin resin a low density PE (MI 20) incorporated by kneading with 5 wt. % of stearic acid as the lubricant is employed and as the inner skin resin a PP homopolymer is employed. The acrylic resin is extruded from the first extruder, PP from the second extruder and PE containing the lubricant from the third extruder and a thick sheet comprising the outer skin layers of 1 mm thickness, the inner skin layers of 0.5 mm thickness and the core of 17 mm thickness is molded at portion A in the die, followed by biaxial orientation at portion B to an entire thickness of 5 mm. After cooling at portion C to a temperature lower than the glass transition temperature of the acrylic resin, the sheet is taken out and the skin layers of PE and PP are removed to obtain a biaxially oriented sheet of acrylic resin with a thickness of about 4 mm.

Molding is made easier when the inner surface at respective portions A, B and C is coated with poly-tetrafluoroethylene.

When no skin resin of PP and PE is provided, biaxially oriented molding of the acrylic resin will be unsuccessful.

EXAMPLE 5

By means of the device as shown in FIG. 7, a three-layer biaxially oriented sheet is molded according to extrusion molding as described above. In FIG. 7, a bisphenol type polycarbonate is extruded by the first extruder, a polymethyl methacrylate (copolymer containing 5 wt. % methyl acrylate, weight average molecular weight 150,000) by the second extruder and a low density polyethylene (MI 20) by the third extruder. The inner surface of the die is lubricated with polydimethyl siloxane. At the portion A in the die, the polycarbonate of the inner core has a thickness of 10 mm, the polymethyl methacrylate of the outer cores sandwiching the inner core has a thickness of 4 mm, and the skins of polyethylene have a thickness of 1 mm. The extruded biaxially oriented sheet is a five-fold stretched sheet with a thickness of about 4 mm. After molding, the polyethylene of the skin layers is removed to give a good biaxially oriented sheet having a three-layer structure of acrylic resin/polycarbonate/acrylic resin with no lubricant attached.

EXAMPLE 6

By means of the device as shown in FIG. 9, an expanded product is extrusion molded according to the process as described above. An expandable resin comprising a homopolymer of propylene with MI 0.5 (ASTM D 1238) formulated with 5 wt. % of Freon 114 as a blowing agent and 0.5 wt. % of a nucleating agent is employed, and nylon 12 is used as the skin resin for surface coating. As the lubricant, polydimethyl siloxane is employed. The expandable resin is pressurized by the extruder into the die, permitted to be cooled uniformly to a temperature suitable for expansion and extruded out of the die to be expanded to obtain an expanded product. After molding, the skins are removed from the molded product to obtain an expanded product with no lubricant attached. When the expandable resin is extruded without use of the lubricant and the skin resins, the flowing resistance in the die will be great whereby making extrusion unstable.

EXAMPLE 7

By means of the extrusion molding device as shown in FIG. 4 and FIG. 5, a sheet of a ultra-high mclecular weight polyethylene was molded. In FIG. 4, a ultra-high molecular weight polyethylene (viscosity average molecular weight: 3,500,000, which was calculated by the following equations, $$[\eta] = 6.2 \times 10^{-4} M^{0.70} \quad [\eta] = \frac{\eta_{SP}}{C + 0.29\eta_{SP}}$$

where M: viscosity average molecular weight, $\eta_{SP}$: specific viscosity, C: solution concentration measured (0.1g/dl, 180° C.) was extruded by the first extruder 30 and nylon 12 by the second extruder 32, and the resins were molded at the portion A in the die 31 into a 15 mm thich three-layer product, with both skin layers being nylon 12 and the core being the ultra-high molecular weight polyethylene. In portion A, the inner surface of the die was lubricated with polydimethyl siloxane. The three-layer molded product of a thickness of 15 mm coated with polydimethyl siloxane was permitted to flow in state of plug flow, deformed at the portion B to a thickness of 5 mm as shown in FIG. 5 and cooled at the portion C. The cooled sheet was taken out from the die and the skins of nylon 12 were removed to obtain a ultra-high molecular weight polyethylene sheet of a thickness of 4.8 mm with no lubricant attached.

EXAMPLE 8

By means of the extrusion molding device as shown in FIG. 4 and FIG. 5, a sheet of a polyphenylene ether having an intrinsic viscosity [η]=0.7 is molded. In FIG. 4, the polyphenylene ether is extruded by the first extruder 30 and a high density polyethylene by the second extruder 32, and the resins are molded at the portion A in the die 31 into a 15 mm thick three-layer product, with both skin layers being the polyethylene and the core being the polyphenylene ether. In portion A, the inner surface of the die is lubricated with polydimethyl siloxane. The three-layer molded product of a thickness of 15 mm lubricated with polydimethyl siloxane is deformed at portion B to a thickness of 5 mm as shown in FIG. 5 and cooled at portion C. The cooled sheet is taken out from the die and the skins of polyethylene are removed to obtain a polyphenylene ether sheet of a thickness of about 5 mm with no lubricant attached.

When the polyphenylene ether is extruded without use of the lubricant and the skin resins, the resin pressure in the die will rise such that no sheet is obtained. If the resin temperature is raised to reduce the resin pressure, then the polyphenylene ether will decompose by heat, and no sheet will be obtained.

It will be apparent to those skilled in the art that various modifications and variations can be made in the present invention. Thus, it is intended that the present invention cover the modifications and variations of this invention provided that they come within the scope of the appended claims and their equivalents.

What is claimed is:

1. A process for compression molding a thermoplastic resin comprising the steps of:
   (a) providing at least one removably thermoplastic resin skin between a thermoplastic core resin to be molded and the surface of a mold or die;
   (b) dispersing a lubricant between said removable skin or skins and said mold or die; and
   (c) molding said thermoplastic core resin in the presence of said removalbe skin or skins and said lubricant by compression molding at a temperature equal to or greater than the glass transition temperature of said thermoplastic core resin such that the following conditions are met:
      (i) said removable skin or skins have a flowability greater than the flowability of said thermoplastic core resin;
      (ii) said removable skin or skins are about 1/10 or less as thick as said thermoplastic core resin; and
      (iii) sufficient force is applied to said removable skin or skins and said thermplastic core resin during molding to achieve substantially uniform plug flow in said thermoplastic core resin.

2. The process according to claim 1, wherein said core resin is made of an acrylic resin.

3. The process according to claim 1, wherein said core resin is made of a ultra-high molecular weight thermoplastic resin having a viscosity average molecular weight of 800,000 or more.

4. The process according to claim 1, wherein said core resin has a three-layer structure.

5. The process according to claim 1 wherein said removable skin or skins is or are of at least one resin selected from the group consisting of polyolefin and polyamide resins.

6. The process according to claim 1, wherein said removable skin or skins has a thickness of from about 0.01 to about 2 mm.

7. The process according to claim 1, wherein said removable skin or skins has or have a double-layer structure including an outer skin layer and an inner skin layer.

8. The process according to claim 7, wherein the viscosity of the thermoplastic resin used for said outer skin layer is lower than the viscosity of said thermoplastic core resin, and the viscosity of the thermoplastic resin used for said inner skin layer is greater than the viscosity of the thermoplastic resin used for said outer skin layer.

9. The process according to claim 1 wherein the step of dispersing a lubricant between said removable skin or skins and said mold or die comprises lubricating the mold or die surface with a lubricant.

10. The process according to claim 1 wherein the step of dispersing a lubricant between said removable skin or skins and said mold or die comprises coating the surface of said removable skin or skins with a lubricant.

11. The process according to claim 1 wherein the step of dispersing a lubricant between said removable skin or skins and said mold or die comprises incorporating said lubricant into said removable skin or skins and allowing said removable skin or skins to bleed out said lubricant during molding.

12. The process according to claim 1, wherein said molding step comprises heating said core resin and removably skin or skins to a temperature higher than the glass transition temperature and lower than the melting point of the thermoplastic core resin compressing said core resin and removable skin or skins in the die heated to approximately the same temperature to form a biaxially oriented sheet having a thickness of from about 1 to about 10 mm after cooling.

13. A process according to claim 12, wherein the step of removing the removable skin or skins from the biaxially oriented sheet occurs after the articles is molded.

14. A molded article made by the process of claim 1.

15. A molded article of an ultra-high molecular weight resin made by the process of claim 1.

16. A molded article formed from the process of claim 1 wherein said article is oriented.

* * * * *